Sept. 10, 1968         A. C. BECK ET AL         3,400,993
       GAS LENS FOR OPTICAL FREQUENCY RANGE USING TWO OR MORE
              GASES HAVING UNEQUAL REFRACTIVE INDICES
Filed June 30, 1964                          2 Sheets-Sheet 1

INVENTORS: A. C. BECK
           G. E. CONKLIN
           A. R. HUTSON
BY H. O. Wright
ATTORNEY United States Patent Office 3,400,993
Patented Sept. 10, 1968

3,400,993
GAS LENS FOR OPTICAL FREQUENCY RANGE USING TWO OR MORE GASES HAVING UNEQUAL REFRACTIVE INDICES
Alfred C. Beck, Red Bank, Glenn E. Conklin, Middletown, and Andrew R. Hutson, Summit, N.J., assignors to Bell Telephone Laboratories, Incorporated, New York, N.Y., a corporation of New York
Filed June 30, 1964, Ser. No. 379,112
15 Claims. (Cl. 350—179)

ABSTRACT OF THE DISCLOSURE

This application describes a gas lens in which focusing action is produced by injecting a second gas into a conduit along which a first gas is flowing. Since the injected gas tends to remain within the outer laminas of the first gas over an extended interval, positive or negative focusing can be produced by the use of a second gas whose refractive index is either smaller or larger than that of the first gas.

Various arrangements for introducing the second gas are described.

---

This invention relates to the transmission of ultrahigh frequency energy beams. More particularly, it relates to means for focusing ultrahigh frequency energy beams.

The following copending applications, all assigned to applicants' assignee, are of interest in connection with the present application: Ser. No. 347,166, filed Feb. 25, 1964, by D. W. Berreman; Ser. No. 353,689, filed Mar. 23, 1964, by D. W. Berreman; Ser. No. 372,992, filed June 5, 1964, by D. W. Berreman; Ser. No. 379,175, filed June 30, 1964, by D. W. Berreman and S. E. Miller.

As stated in the above-mentioned copending applications, when an ultrahigh frequency beam such as a laser beam or the like is to be transmitted through a long conduit, or the like, it is desirable to have means distributed along the conduit to focus the beam so as to substantially eliminate scattering or spreading of rays of the beam and to thus constrain the beam to a path, which substantially coincides with the longitudinal axis of the conduit, or the like.

As is further disclosed in the above-mentioned copending applications, a number of means for effecting the focusing of a beam being transmitted along a conduit to constrain its path to substantial coincidence with the longitudinal axis of the conduit have been devised.

The present application proposes novel means for effecting the above-mentioned result, in systems, in which a laminar flow of a first gas is maintained through an elongated conduit of, for example, several hundreds of miles in length, the means comprising a large plurality of means at suitably spaced intervals along the conduit for injecting a second gas or, alternately, a second and a third gas, respectively, of appreciably different refractive index or indices from that of the first gas into the conduit from the periphery of the conduit in such manner that the injected gas or gases tends or tend, respectively, by virtue of the phenomenon of laminar flow to remain for an appreciable period in the outer laminas of the flowing gas within the conduit, thus inducing a radially varying index of refraction from its axis to its periphery in the vicinity of said intervals.

If the injected gas in any specific instance has a smaller index of refraction than that of the gas flowing in the conduit, a positive or converging focusing effect is produced. Conversely, if the injected gas in a specific instance has a larger index of refraction, the focusing effect is negative or diverging.

If alternating gradient focusing, as discussed in detail, for example, in the above-mentioned copending application of Berreman and Miller, is desired, it is of course necessary to alternately produce positive and negative focusing effects at discretely positioned successive intervals along the conduit. Should a system employing only positive focusing be desired, no negative or diverging focusing effects would, obviously, be introduced.

Accordingly, a principal object of the invention is to effect focusing of the beam along the longitudinal axis of the conduit in a transmission system in which an ultrahigh frequency energy beam is to be transmitted through a long conduit.

Other and further objects, features and advantages of the invention will become apparent from a perusal of the description of illustrative embodiments given hereinunder and from the appended claims taken in conjunction with the accompanying drawing, in which:

FIG. 1 illustrates diagrammatically an ultrahigh frequency beam transmission system employing a first structure for practicing the principles of the invention;

FIG. 2 illustrates a modification of a portion of the structure of FIG. 1;

Figure 3:
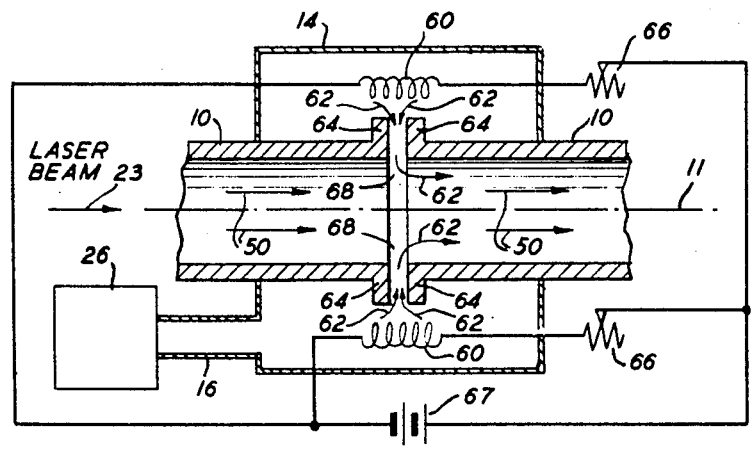
FIG. 3 illustrates diagrammatically a second modification of the structure of the invention as per FIG. 1.

In more detail in FIG. 1, a generator of ultrahigh frequency electromagnetic wave energy such, for example, as laser 24 generates and emits a beam 23 of ultrahigh frequency energy. A modulator 25 may, for example, be employed to impress modulation representing, usually, intelligence signals such as audio and video signals, and/or data signals or the like on the beam, which is then transmitted along the longitudinal center line 11 of conduit 10. Conduit 10 is, in general, impervious to gases and to the energy of the beam 23. It will in general be of great length as indicated by gap 15 and be employed as a long distance transmission medium to interconnect widely separated cities, such, for example, as New York and Chicago.

At intervals along conduit 10, a section 12 of a material which is porous to gases is substituted for a like section of conduit 10 and is enclosed in a gas-tight chamber 14 which preferably has a diameter appreciably greater than that of conduit 10.

A first source of gas 22 having suitable conventional controls (not shown) of pressure, temperature, and volume furnishes a first gas of a first refractive index through tube 20 and chamber 18 to the input of conduit 10 sufficient to maintain a preselected steady laminar flow of said first gas through conduit 10 and the porous sections 12 inserted in conduit 10. The volume of chamber 18 is proportioned and the volume and velocity of the gas are regulated to avoid turbulence which would, of course, tend to preclude smooth laminar flow through conduit 10.

A second source of gas 26 also having suitable conventional controls (not shown) of pressure, temperature and volume furnishes a second gas of a second refractive index differing substantially from that of said first gas, through tube 16 to enclosure 14 surrounding porous section 12.

The second gas passes through the porous section 12 and diffuses into the stream of the first gas passing along conduit 10 and porous section 12. The second gas obviously first enters the outermost laminas of the flow of the first gas. The second gas travels an appreciable distance along the conduit in the outer laminas of the first gas before it diffuses sufficiently into the stream of the first gas to reach the longitudinal axis 11 and equalize to produce a homogeneous combination of both gases transversely to the direction of flow.

Up to such a point, the entry of the second gas has produced a mixture of gases having substantially the said first index of refraction along the axis 11 and the second index of refraction adjacent the wall of conduit 10 and member 12, with a variation radially from one index to the other from the axis to the inner periphery of the conduit.

Both gases must of course be transparent to the energy beam 23. If the index of refraction of the first gas is greater than that of the second gas, a positive focusing action is exerted on the energy beam. If the reverse situation exists, a negative focusing action results. Carbon dioxide is, for example, suitable as the gas of greater refractive index when helium or air is employed as the gas of smaller refractive index. A number of other heavy gases having appreciable indices of refraction and being otherwise suitable for use in lenses of the present invention are listed in the copending application of K. B. McAfee, Ser. No. 357,424, filed Apr. 6, 1964. As taught in the second of the above-mentioned copending applications to D. W. Berreman, combinations in which the two gases which have appreciably differing indices of refraction but substantially the same densities tend to produce smoother focusing action.

Member 12 may be of any suitably rigid porous material such as laminated filter paper, porous metallic or ceramic tubes, or the like.

The intensity of the focusing action may be increased by suitably increasing the flow of one or both gases, or by increasing the pressure and/or temperature of one or both gases or by combinations of these adjustments.

Heating or cooling the injected gas or the gas flowing in the conduit can obviously be made to contribute an additional focusing effect substantially in the manners described and claimed in the above-mentioned copending joint application of Berreman and Miller, as well as modifying the focusing effect in accordance with the specific teachings of the present application.

Actual performance tests have shown that the focusing action of a lens of the invention of the general type described in detail above actually continues for an appreciable distance beyond the chamber 14 in the direction of flow of gas in conduit 10 indicating that the complete diffusion of the second gas toward the axis 11 requires an appreciable time interval.

While the refractive indices of most gases are relatively quite small, the substantial "thickness" along the longitudinal axis of the "two-gas" lenses of the present invention is believed to be the cause of the truly sizable focusing action observed, focal lengths as short as five or six inches being easily obtained. Conversely, focal lengths of as long as 100 to 200 meters are also readily obtained. The ease with which the focusing effect (that is, focal length) can be adjusted, over a substantial range by changing the flow rates and/or the temperature and/or the pressure or kind of one or both gases, furthermore, suggests that numerous and varied uses lenses of this and related types will soon become extremely important.

If the gases employed are of sufficient value to warrant measures to retrieve and/or separate them, storage means and other suitable apparatus may be attached to the conduit at suitable intervals as suggested, for example, in one or more of the above-mentioned copending applications and fresh or reconditioned supplies of gas furnished to the conduit and successive chambers 14, respectively, along the conduit.

Where an alternating gradient focusing system is to be employed, as discussed in the Berreman-Miller application, the alternate injections of a gas of lower refractive index and one of greater refractive index into the flow of gas from consecutive chambers 14 along the conduit, in accordance with the teachings of the present application, can be balanced so that a complete renewal of the gas in the conduit is necessary, if at all, only over very long sections of an extended system.

In FIG. 2 a second arrangement for injecting the second gas into the laminar flow of the first gas in the conduit is diagrammatically illustrated. In FIG. 2, the porous tube 12 of FIG. 1 is omitted and a small gap 54 is left between abutting ends of two sections of conduit 10. The laminar flow of the first gas, indicated by arrows 50, upon approaching the gap 54 may be slightly constricted by insertion of a curved nozzle-like member 52 in conduit 10, as shown. The second gas indicated by arrows 56 then enters the outer laminas of the column of gas flowing to the right of gap 54. The combined gases will flow to the right for an appreciable distance before the injected gas will diffuse thoroughly into the more centrally located laminas of the other gas. The focusing action is obviously much the same as that of the arrangement of FIG. 1 as described in detail hereinabove. Some improvement in the operation of the arrangement of FIG. 2 can be effected by inclining the sides of gap 54 so that the injected gas initially has a component of motion toward the right.

In FIG. 3 a third arrangement is shown for causing a radial variation of the index of refraction of the column of gas indicated by arrows 50 flowing through conduit 10.

In a specific example of this case it is contemplated that both gases will be air, preferably filtered to remove dust and the like. The air may, of course, also be otherwise conditioned as may be considered desirable. As in the arrangement of FIG. 2, a gap 68 is left between two portions of conduit 10 within enclosure 14. Baffles 64 are provided at the adjacent ends of the two portions of conduit 10. Air from source 26 through input pipe 16 to chamber 14 is passed around baffles 64 and near heating coils 60. The temperature of coils 60 in each instance may be controlled by adjustment of a rheostat 66 to control the power supplied by source 67. The air, represented by arrows 62, is heated just prior to entering conduit 10 and is consequently expanded, reducing its refractive index in inverse proportion to its temperature and providing the radial variation of the index of refraction in conduit 10 for an appreciable distance to the right of gap 68. If desired, the gap between the two portions of conduit 10 in FIG. 3 can be bridged by a section of porous tubing shorter but otherwise similar to tube 12 of FIG. 1. The arrangement of FIG. 3 as described above obviously will produce a positive focusing effect. Alternatively, it is obvious that other gases or pairs of differing gases instead of air can be used in the arrangement of FIG. 3 and that the relative temperatures of the air or other gas flowing in the conduit and the injected air or other gas can be initially adjusted by conventional means (not shown) to produce augmented focusing of either positive (converging) or negative (diverging) character as may be desired.

Figure 4:
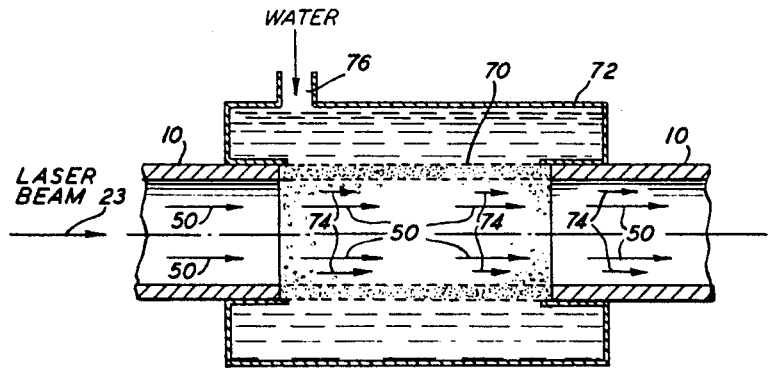
FIG. 4 illustrates diagrammatically a third modification of the structure of the invention as per FIG. 1.

In FIG. 4, a porous tube 70 of a material such, for example, as porous ceramic is used to replace a like section of conduit 10 and is enclosed in closure 72 which is, by way of a specific example, filled with water through port 76. Water oozing through the inside of tube 70 causes water vapor, indicated by arrows 74, to be formed in the outer laminas of the air indicated by arrows 50 flowing toward the right through conduit 10. Since water vapor has a lower index of refraction than air, the arrangement as described immediately above for FIG. 4 will also produce a positive focusing effect.

The arrangements of FIGS. 3 and 4 have the advantage of being capable of using air, available in abundant supply at substantially a minimum cost, and water (FIG. 4) also usually available in abundant supply. In both instances, if air or air and water are used no problems with respect to recovering one or more of the "gases" or of separating two different gases from each other for further use are involved, as both the air and the water vapor can readily be ejected from the conduit at convenient intervals and either reconditioned or replaced by fresh supplies. In FIG. 4, control of the temperature of the water and the pressure, temperature and volume of the air flowing through conduit 10 can obviously be employed to control the degree of focusing which will result.

It is obvious that any suitable gas other than air may be employed as gas 50 of FIG. 4 and any other liquid which will ooze through porous tube 70 of FIG. 4 and whose vapor has a refractive index differing substantially from that of gas 50 may be substituted in the arrangement of FIG. 4 to obtain focusing effects, if desired.

The above arrangements, while illustrative of the application of various principles of the invention, are not to be taken as limiting the invention. Numerous and varied modifications and rearrangements within the spirit and scope of said principles will readily occur to those skilled in the art.

What is claimed is:

1. A gas lens for focusing an optical beam, or the like, comprising: an elongated conduit along which there is caused to flow a first transparent gas, and along which an optical beam, or the like, is to be transmitted; and means, disposed about the periphery of a section of said conduit, for introducing into said conduit a second transparent gas having a refractive index differing from the refractive index of said first gas; said second gas being introduced into said conduit so as to produce a radial refractive index gradient across said conduit in a manner to cause a focusing effect upon said beam.

2. The lens of claim 1 in which the refractive index of said first gas is greater than the refractive index of said second gas.

3. The lens of claim 1 in which the refractive index of said second gas is greater than the refractive index of said first gas.

4. The lens of claim 1 in which said means comprises an elongated porous tube.

5. The lens of claim 4 in which the refractive index of said first gas is greater than the refractive index of said second gas.

6. The lens of claim 4 in which the refractive index of said first gas is less than the refractive index of said second gas.

7. The lens of claim 1 in which said means is a gap in said conduit.

8. The lens of claim 7 in which a nozzle-like member is inserted in said conduit at one side of said gap.

9. The lens of claim 1, in which said first gas is air at a first temperature and said second gas is air at a second temperature differing substantially from said first temperature.

10. The lens of claim 1 in which said first gas is air and said second gas is water vapor.

11. The lens of claim 1 and means for altering the relative temperatures of the two gases.

12. The lens of claim 1 in which the two gases are of substantially the same density.

13. An ultrahigh frequency energy beam transmission system which comprises an elongated conduit, means for creating a laminar, nonturbulent flow of a first transparent gas having a first refractive index through said conduit and a plurality of means at intervals along said conduit for injecting into the outer laminas of said flow of said first gas a second transparent gas having a second refractive index appreciably differing from said first refractive index, said conduit being adapted to accommodate the transmission of a beam of ultrahigh frequency energy substantially along the longitudinal axis of said conduit.

14. The system of claim 13 in which the said second injected gas has a lower refractive index than the said first gas flowing through the conduit.

15. The system of claim 13 in which successive means for injecting gas into said conduit inject gases of greater refractive index and smaller refractive index, respectively, than the index of the gas flowing through the conduit.

References Cited

UNITED STATES PATENTS

| | | |
|---|---|---|
| 3,310,356 | 3/1967 | Borberg _____ 350—63 |
| 2,980,802 | 4/1961 | Bracey et al. |
| 3,067,420 | 12/1962 | Jones et al. |
| 3,083,123 | 3/1963 | Navias. |

JOHN K. CORBIN, *Primary Examiner.*